Dec. 9, 1952     G. J. SCOLES     2,621,263
PULSE AMPLIFIER
Filed Feb. 4, 1948
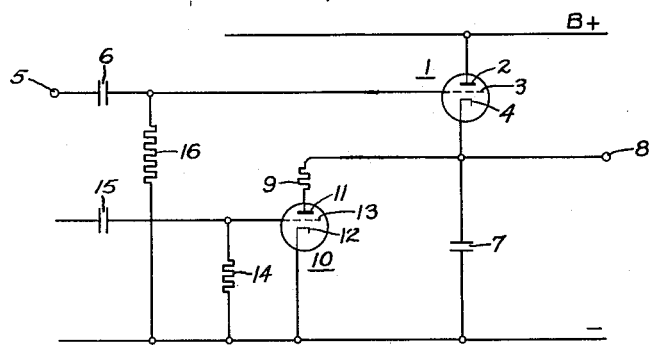
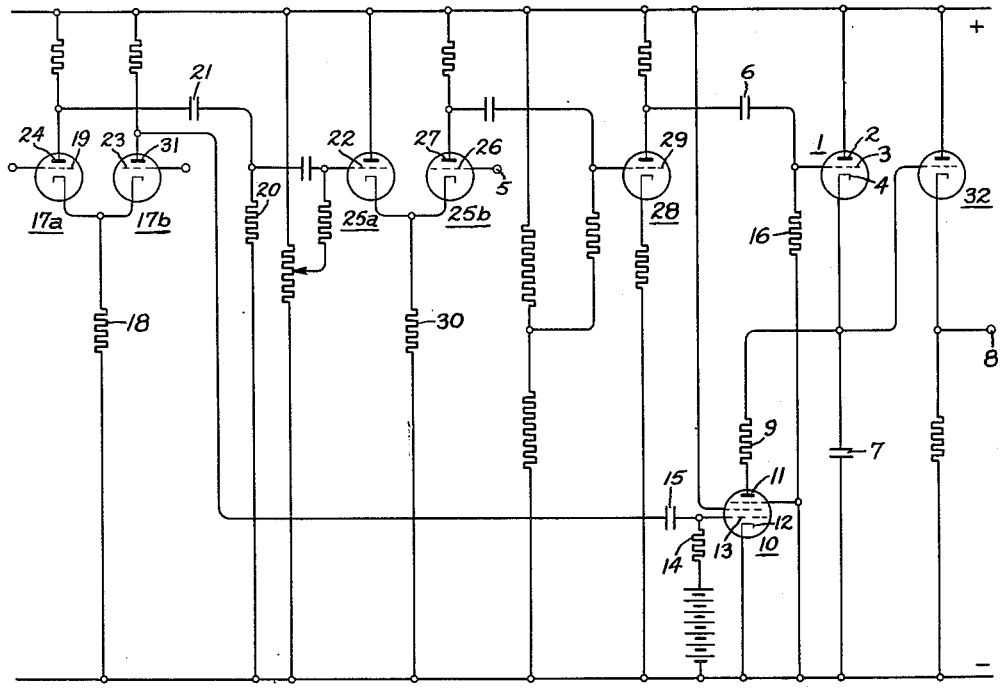
Inventor:
Graham J. Scoles,
by Morton D. Morse
His Attorney.

Patented Dec. 9, 1952

2,621,263

UNITED STATES PATENT OFFICE 2,621,263

PULSE AMPLIFIER

Graham J. Scoles, London, England, assignor to General Electric Company, a corporation of New York Application February 4, 1948, Serial No. 6,157
In Great Britain July 9, 1946

Section 1, Public Law 690, August 8, 1946
Patent expires July 9, 1966

5 Claims. (Cl. 179—171)

My invention relates to apparatus for receiving radio frequency signals and, more particularly, to apparatus for indicating or recording variations in amplitude of recurring signals.

My invention is particularly applicable to measuring the variation in amplitude of recurrent pulses and may be utilized in connection with telemetry systems or the like. In systems of this type different items of information are simultaneously transmitted between two points by collecting the various items of information at a transmitter and transmitting them in recurring sequence to a receiver where they are sorted out.

It is an object of my invention to provide an improved system for obtaining an indication of the amplitude of the individual items of information after separation at the receiver.

A further object of my invention is to provide an improved system for obtaining an indication of the amplitude of items of information that may be indicated and recorded by suitable apparatus.

As the individual items at the receiver are fed to the various circuits in the form of pulses, a remembering circuit is advantageous. Normally, such a circuit may be constituted by a capacitor which is charged in accordance with the pulse amplitude and which substantially maintains the charge between pulses. With such an arrangement, no great difficulty is encountered in measuring the amplitude of the recurrent signals which have a steady value or a progressively increasing value. However, in conditions in which the signals are liable to reduce in value, considerable difficulty is encountered as it becomes necessary to discharge the capacitor.

A main object of my invention is to provide an improved circuit which overcomes this difficulty. My invention comprises a device which, during reception of signals, passes to a capacitor a charging current which charges the capacitor to a voltage dependent in magnitude upon the signal amplitude. The condenser is provided with a negligible discharge path, together with an electron discharge device that is rendered conductive within the duration of each pulse and is so connected in shunt with the capacitor as to discharge it as the signal amplitude falls. The voltage across the capacitor is a function of the signal amplitude during the pulse periods and may be employed to operate suitable apparatus for indicating and/or recording the signal amplitude.

For additional objects and advantages, and for a better understanding of the invention, attention is now directed to the following description and accompanying drawing, and also to the appended claims in which the features of the invention believed to be novel are particularly pointed out.

In the drawing—

Fig. 1 is a circuit arrangement illustrating one embodiment of my invention.

Fig. 2 is a schematic diagram of a strobing circuit such as may be employed for telemetry reception, in which one embodiment of my invention is utilized.

Referring now to Fig. 1, I have shown an electron discharge device 1, having an anode 2, a control electrode 3 and a cathode 4. Input signals are applied from an input terminal 5 through a coupling capacitor 6 to the control electrode 3. Device 1 controls the charging of a capacitor 7. One terminal of the capacitor 7 is connected to the cathode 4 of the device 1 and the other to the low voltage side of the circuit. An output terminal 8 is taken from the common terminal of the capacitor 7 and the cathode 4. Any suitable recording or indicating instruments (not shown) may be connected to the output terminal 8.

The signals applied to the input terminal 5 pass through the capacitor 6 to the control grid 3 of the device 1 which charges the capacitor 7. Thus, each time a signal is received at the terminal 5, the capacitor 7 will be charged to an amount which is a function of the amplitude of the signal and will tend to remain at a substantially constant voltage between signals. It will be appreciated that by connecting suitable apparatus to the output terminal 8, an indication of the amplitude of the last signal received may be obtained. These conditions, however, hold only so long as the signals are either of steady or increasing amplitude. However, if the signals reduce in amplitude, it is then necessary to discharge the capacitor 7 so as to reduce the voltage applied to the output terminal 8. In order to discharge the capacitor 7 in such circumstances, a normally non-conductive discharge device 10 is connected across the capacitor 7 in series with a resistance 9. Within the duration of each pulse a switching signal is applied to the grid 13 of the device 10 to render it conductive. The device 10 should have a high impedance when conducting as compared to the impedance of device 1, and likewise the discharging circuit through the resistance 9 and device 10 should be of high impedance as compared to the impedance of the charging circuit through device 1. It then follows that when a signal is applied, the potential derived at the terminal 8 will be determined by the amplitude of the signals applied to the terminal 5. Thus, if the signals remain steady or increasing, the shunting effect of the device 10 and resistance 9, on the capacitor 7, is relatively small. However, as the amplitude of the signals decreases, the shunting effect increases and the capacitor 7 will be discharged through the device 7 and resistance 9 until it reaches a voltage commensurate with the reduced signal amplitude. The output voltage supplied at the terminal 8 is then an indication of the amplitude of the last signal irrespective of whether the signals are increasing or decreasing in amplitude.

Reference is now made to Fig. 2, which shows the application of the invention to a telemetry system in which the data at the receiving end is sorted out by locally generating a time base synchronized with the cycle of information. Such a time base is strobed to render operative an indicating or recording apparatus at positions along the time base corresponding to those instances at which the required items occur in the transmission. The term strobing apparatus is applied to apparatus responsive to the time base voltage, which trips when it reaches a value corresponding to the required position in a cycle. The electron discharge devices 17a and 17b together constitute a strobing circuit in which the device 17b is initially conductive. Due to the current flowing through a resistance 18, a cathode bias is applied to maintain device 17a normally cut off. The terminal 19 is connected to a time base circuit (not shown) and the operation is such that when the time base reaches a predetermined value, the device 17a conducts and produces a negative-going signal, which, after differentiation by a capacitor 21 and resistance 20, is applied as a negative-going pulse to an electron discharge device 25a. The position along the time base at which this tripping occurs, may be adjusted by a suitable bias (not shown) applied to the control grid 23 of the device 17b. The voltage drop produced at the anode 24 of the device 17a, is converted into a negative pulse by the time constant circuit comprising capacitor 21 and resistance 20 the values of which are chosen to produce the desired pulse duration.

The device 25a together with the electron discharge device 25b constitute a gating circuit. The input signals are applied to the control grid 26 of the device 25b. The output signals are derived from the anode 27 and are passed to the control grid 29 of an electron discharge device 28 which operates as a phase reversing device. The gating device 25b is so arranged that input signals are applied continuously to the grid 23, but the device is only effective to pass these signals to the phase reversing device 28 during the pulses above-mentioned. This gating effect is produced by the control device 25a which is normally conductive and due to the voltage drop produced across the resistor 30 applies cathode bias to cut off the gating device 25. When a negative pulse is applied to the grid 22 of the device 25a, the bias is removed from the device 25b which is then rendered conductive.

The output from the phase reversing device 28 is applied to the device 1 which operates in a manner as described in connection with Fig. 1. The switching signals are applied to the grid 13 of the device 10 from the anode 31 of the device 17b or from any other suitable source. The capacitor 6 and resistance 16 act as a differentiating circuit to terminate the pulse. The output from the capacitor 7 is then applied to the control grid of a cathode follower electron discharge device 32 and thence to the output terminal 8.

While certain specific embodiments have been shown and desrcibed, it will, of course, be understood that various modifications may be made without departing from the invention. The appended claims are, therefore, intended to cover any such modifications within the true spirit and scope of the invention.

What I claim as new and desire to secure by Letters Patent of the United States is:

1. In combination, a pulse amplifier comprising an electron discharge device having an input and an output circuit, a source of gating signals, a source of recurring pulses, a storage device having a normally negligible discharge path connected in said output circuit, means for charging said storage device to a voltage dependent upon the magnitude of said pulses comprising means for applying said pulses to said input circuit, means including a normally non-conducting electron discharge device connected in shunt with said storage device for discharging said storage device, said last means having a high impedance relative to the impedance of said charging means, and means for rendering last said device conductive during each input pulse comprising means for applying said gating signals to the input circuit of said normally non-conducting device.

2. In combination, a pulse amplifier system comprising a first electron discharge device having an inpult circuit and an output circuit, a source of input pulse signals, a source of switching signals, a gating device arranged responsive to said switching signals and connected to pass gated input pulse signals only during predetermined pulse periods, means including connections with said gating device to said input circuit for rendering said first electron discharge device conductive in accordance with input pulse signals passed by said gating device, a capacitor connected in said output circuit, a discharge path for said capacitor, said discharge path including a second electron discharge device having a high impedance relative to the impedance of said first discharge device, means for charging said capacitor through said first electron discharge device to a voltage dependent in magnitude upon said gated pulse signals, and means for rendering said second electron discharge device conductive during each of said gated input pulse periods, said last means including a connection from said source of switching signals to said second electron discharge device.

3. In combination, a pulse amplifying system comprising a capacitor, a charging circuit for said capacitor including a source of potential and the anode-to-cathode path of a first grid-controlled electron discharge device, a discharging circuit for said capacitor including the anode-to-cathode path of a second grid-controlled electron discharge device, said charging circuit having a low impedance relative to the impedance of said discharging circuit when said respective devices are conductive, a source of input pulse signals, a source of switching signals, a gating device arranged responsive to said switching signals and connected to pass input pulse signals only during predetermined pulse periods, means for rendering said first electron discharge device conductive, said last means including connections from said gating device for applying input pulse signals passed by said gating device to the control grid of said first electron discharge device, and means for rendering said second electron discharge device conductive, said last means including connections for applying said switching signals to the control grid of said second electron discharge device.

4. In combination a source of gating pulses, a source of variable signals occurring solely during the period of said gating pulses, a storage circuit, means for passing to said storage circuit a charging current for charging said storage circuit to a voltage dependent in magnitude on amplitude of said signals, and means for modifying the charge on said storage circuit in accordance with the amplitude of said signals comprising an electron discharge device connected in parallel with said storage circuit, and means for controlling the conduction of said device in accordance with said gating pulses.

5. In combination, a source of unidirectional potential, an electron discharge device comprising an anode, cathode and control electrode, means connecting said anode to the positive terminal of said source, a condenser connecting the cathode electrode to the negative terminal of said source, a source of gating pulses, a source of variable amplitude pulses occurring during the period of said gating pulses, means for applying said variable amplitude pulses between said control electrode and said negative terminal, a second electron discharge device comprising an anode, cathode and a control electrode, means connecting said second device anode to the cathode of said first device, means connecting said second device cathode to the negative terminal of said source and means for applying said gating pulses between said second device control electrode and the said negative terminal.

GRAHAM J. SCOLES.

REFERENCES CITED

The following references are of record in the file of this patent:

UNITED STATES PATENTS

| Number | Name | Date |
| --- | --- | --- |
| 2,078,792 | Fitzgerald | Apr. 27, 1937 |
| 2,110,015 | Fitzgerald | Mar. 1, 1938 |
| 2,113,011 | White | Apr. 5, 1938 |
| 2,275,460 | Page | Mar. 10, 1942 |
| 2,409,897 | Rado | Oct. 22, 1946 |
| 2,419,340 | Easton | Apr. 22, 1947 |
| 2,435,579 | Francis | Feb. 10, 1948 |
| 2,488,567 | Stodola | Nov. 22, 1949 |